United States Patent
Kim

(10) Patent No.: US 8,927,139 B2
(45) Date of Patent: Jan. 6, 2015

(54) POUCH TYPE BATTERY

(75) Inventor: Jaehyung Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 56 days.

(21) Appl. No.: 13/486,282

(22) Filed: Jun. 1, 2012

(65) Prior Publication Data

US 2013/0171508 A1    Jul. 4, 2013

(30) Foreign Application Priority Data

Jan. 3, 2012  (KR) .................. 10-2012-0000751

(51) Int. Cl.
*H01M 2/00* (2006.01)

(52) U.S. Cl.
USPC ............ 429/163; 429/167; 429/121; 429/122

(58) Field of Classification Search
USPC .................. 429/163, 167, 121, 122
See application file for complete search history.

(56) References Cited

U.S. PATENT DOCUMENTS

| | | | |
|---|---|---|---|
| 2006/0105237 A1* | 5/2006 | Oh | 429/180 |
| 2007/0154784 A1 | 7/2007 | Seo | |
| 2010/0251540 A1 | 10/2010 | Seo | |
| 2011/0076520 A1* | 3/2011 | Lee et al. | 429/7 |

FOREIGN PATENT DOCUMENTS

| | | |
|---|---|---|
| JP | 2000-100402 A | 4/2000 |
| KR | 10-2000-0073090 A | 12/2000 |
| KR | 2007-0071256 | 7/2007 |
| KR | 10-2010-0071814 A | 6/2010 |

* cited by examiner

*Primary Examiner* — Jane Rhee
(74) *Attorney, Agent, or Firm* — Lee & Morse, P.C.

(57) ABSTRACT

A pouch type battery, including: an electrode assembly; a pouch accommodating the electrode assembly; a first electrode tab electrically connected to the electrode assembly, the first electrode tab extending outside of the pouch; a positive temperature coefficient (PTC) device electrically connected to the first electrode tab, the PTC device being fixed to the pouch by a photocurable adhesive; and a lead plate electrically connected to the PTC device.

16 Claims, 3 Drawing Sheets

POUCH TYPE BATTERY

BACKGROUND

1. Field

Aspects of the embodiments relate to a pouch type battery.

2. Description of the Related Art

Unlike primary batteries, which cannot be recharged, secondary batteries can be repeatedly charged and discharged. Low capacity batteries that use single battery cells are used as power sources for various small portable electronic devices such as cellular phones and camcorders. High power batteries that use tens of battery cells connected to each other in a battery pack are used as power sources for electric scooters, and hybrid electric vehicles (HEV).

Secondary batteries are manufactured in various shapes. Specifically, a pouch type battery includes an electrode assembly having a separator as an insulator disposed between a positive electrode plate and a negative electrode plate, and a thin flexible pouch that retains the electrode assembly. The pouch type battery includes devices or circuits for protecting the battery, and a tape for fixing, e.g., securing, the devices or circuits.

Typically, however, the tape cannot be applied by an automated process. As such, an operator is required to adhere the tape to each pouch type battery, making the adhering operation burdensome. In addition, adhering positions or adhesion strength may vary according to differences in the operator's work.

SUMMARY

One or more embodiments may provide a pouch type battery, including: an electrode assembly; a pouch accommodating the electrode assembly; a first electrode tab electrically connected to the electrode assembly, the first electrode tab extending outside of the pouch; a positive temperature coefficient (PTC) device electrically connected to the first electrode tab, the PTC device being fixed to the pouch by a photocurable adhesive; and a lead plate electrically connected to the PTC device. The pouch may include a first pouch and a second pouch for accommodating the electrode assembly, adhesion parts including opposite sides of the first pouch and the second pouch that are adhered together, and a planar part extending between and connecting the adhesion parts.

The first electrode tab may extend through the planar part of the pouch and includes an exposed portion. The exposed portion of the first electrode tab may include a bent portion positioned above the planar part. An insulator may be between the first electrode tab within the planar part and interior walls of the planar part. The insulator may surround the first electrode tab within the planar part. The photocurable adhesive may be on the PTC device and may fix the PTC device to an upper portion of the planar part. The photocurable adhesive may include a first photocurable adhesive on the planar part, and a second photocurable adhesive covering an upper portion of the first electrode tab, the PTC device and the lead plate, the upper portion of the first electrode tab being on the first photocurable adhesive. The first photocurable adhesive may adhere the first electrode tab and the lead plate to the planar part. The second photocurable adhesive may extend along a side of the first electrode tab and a side of the lead plate.

A second electrode tab may be electrically connected to the electrode assembly and extend through the planar part of the pouch. The lead plate may be on both the first and second pouches. The first and second pouches may each include a metal layer sandwiched between insulation layers. The photocurable adhesive may expose a portion of the lead plate.

The PTC device may include: a first PTC lead plate electrically connected to the first electrode tab; a second PTC lead plate electrically connected to the lead plate; and a PTC device body between the first PTC lead plate and the second PTC lead plate and electrically connected to the first lead plate and the second lead plate. The photocurable adhesive may include an insulating hardener hardened by UV radiation and an insulating resin. The pouch type battery may further include a second electrode tab electrically connected to the electrode assembly and extending outside of the pouch.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
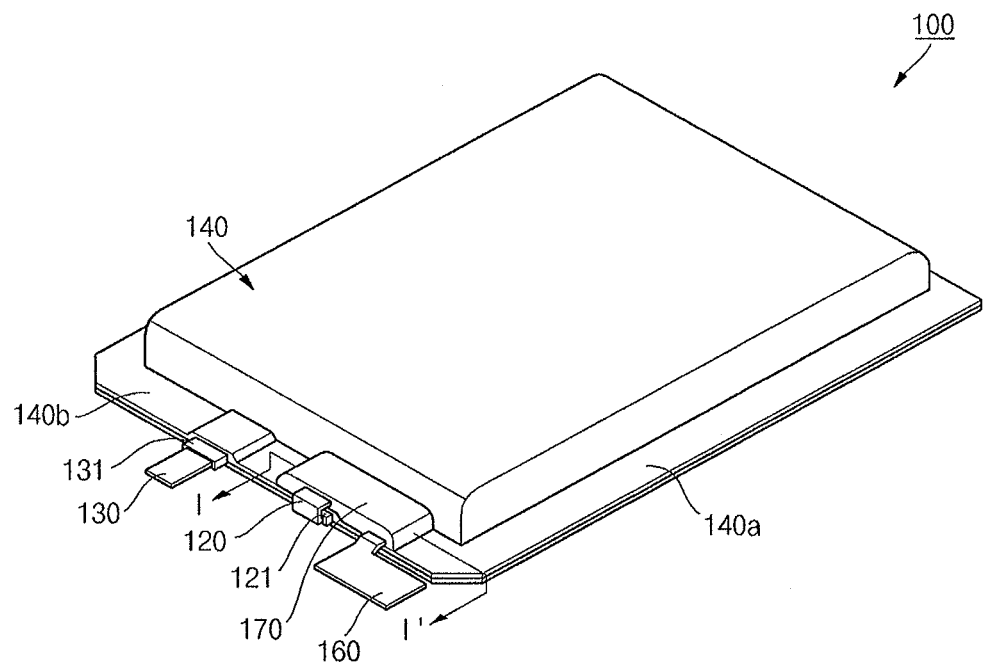
FIG. 1 illustrates a perspective view of a pouch type battery according to one embodiment.

Korean Patent Application No. 10-2012-0000751, filed on Jan. 3, 2012, in the Korean Intellectual Property Office, and entitled: "Pouch Type Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, examples of embodiments will be described in detail with reference to the accompanying drawings such that they can easily be made and used by those skilled in the art. The same reference numerals are used throughout the drawings to refer to the same or like elements.

Figure 2:
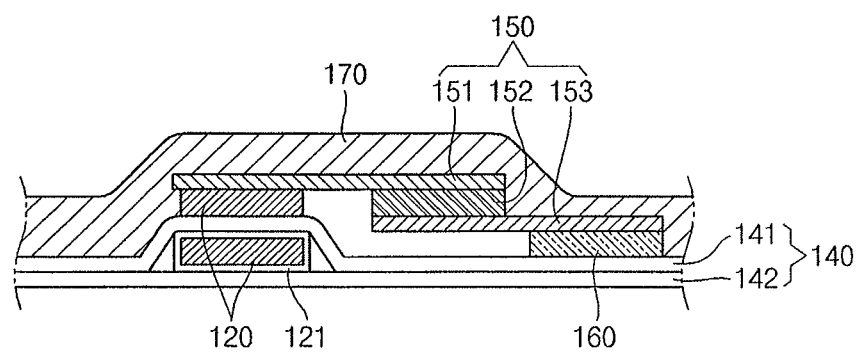
FIG. 2 illustrates a cross-sectional view of the pouch type battery of FIG. 1, taken along line I-I'.
Figure 3:
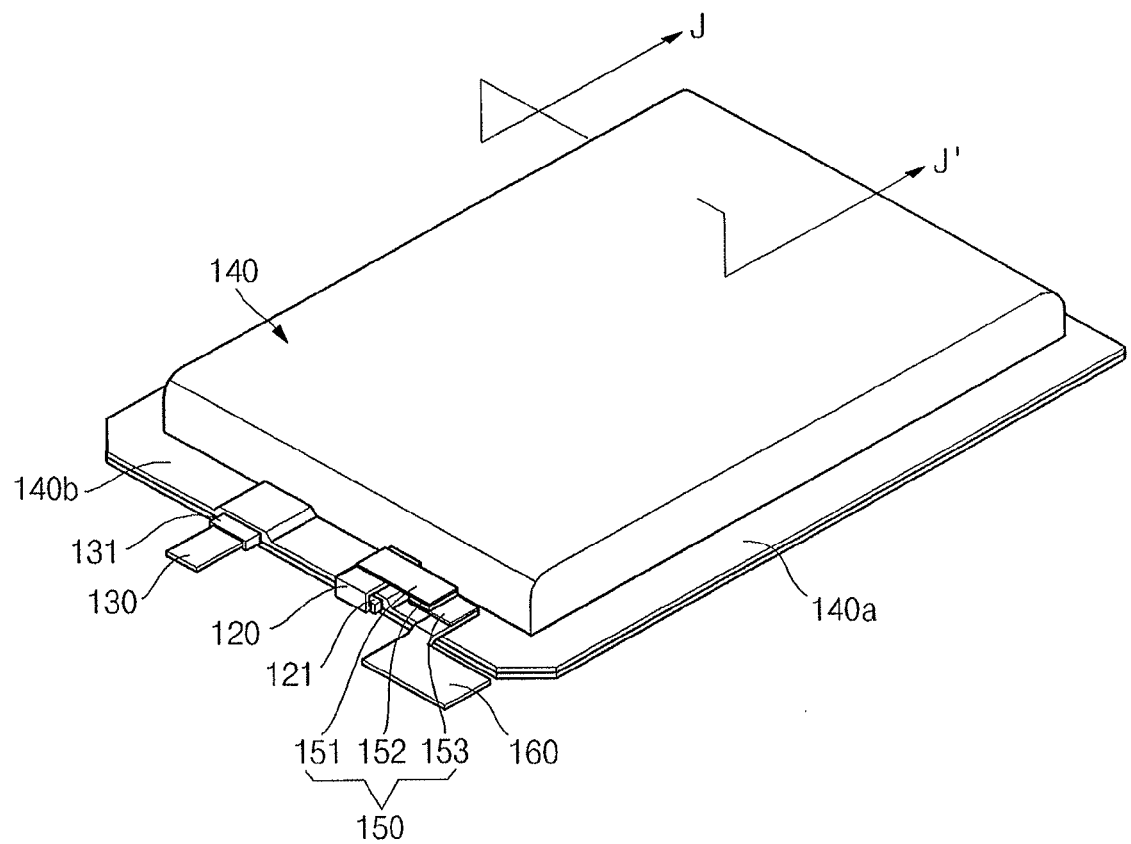
FIG. 3 illustrates a perspective view of the pouch type battery shown in FIG. 1 before a photocurable adhesive is formed.
Figure 4:
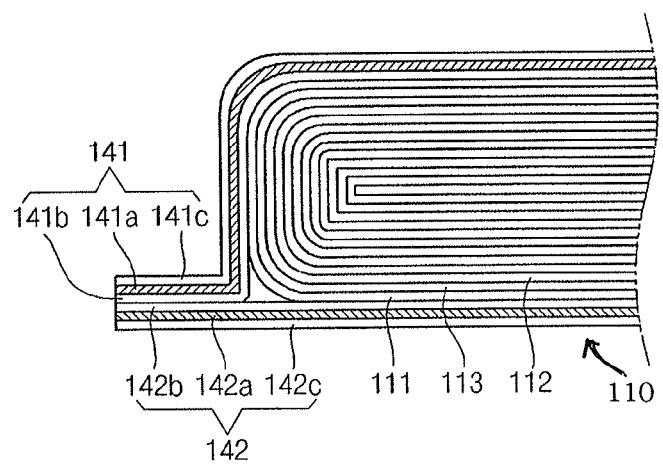
FIG. 4 illustrates a cross-sectional view of the pouch type battery of FIG. 3, taken along line J-J'.

Hereinafter, a pouch type battery according to an embodiment will be described with reference to FIGS. 1 to 4. FIG. 1 illustrates a perspective view of a pouch type battery according to an embodiment. FIG. 2 illustrates a cross-sectional view of the pouch type battery of FIG. 1, taken along line I-I'. FIG. 3 illustrates a perspective view of the pouch type battery shown in FIG. 1 before a photocurable adhesive is formed. FIG. 4 illustrates a cross-sectional view of the pouch type battery of FIG. 3, taken along line J-J'.

First, as shown in FIGS. 1 to 4, the pouch type battery 100 may include an electrode assembly 110, a first electrode tab 120, a second electrode tab 130, pouch 140, a positive temperature coefficient (PTC) device 150, a lead plate 160 and a photocurable adhesive 170.

The electrode assembly 110 may be fabricated by winding or stacking a stacked structure of a first electrode plate 111, a separator 113 and a second electrode plate 112, which may be formed of thin plates or layers. The first electrode plate 111 may function as a positive electrode and the second electrode plate 112 may function as a negative electrode, or vice versa. In addition, the electrode assembly 110 may be accommodated in the pouch 140. For example, the electrode assembly 110 may be retained in a cavity of the pouch 140.

The first electrode plate 111 may be formed by applying a first electrode active material (e.g., a transition metal oxide) on a first electrode collector formed of metal foil (e.g., aluminum foil). The material of the first electrode plate 111 is not limited to the specific materials described herein.

The second electrode plate 112 may be formed by applying a second electrode active material (e.g., graphite or carbon) on a second electrode collector formed of metal foil (e.g., nickel or copper foil). The material of the second electrode plate 112 is not limited to the specific materials described herein.

The separator 113 may be disposed between the first electrode plate 111 and the second electrode plate 112 to reduce the possibility of and/or prevent a short circuit, and to facilitate movement of lithium ions. The separator 113 may be formed of polypropylene, polyethylene, or a composite film of polypropylene and polyethylene. However, the material of the separator 113 is not limited to the specific materials described herein.

In the electrode assembly 110, the first electrode plate 111 and the second electrode plate 112 may be electrically connected to the first electrode tab 120 and the second electrode tab 130, respectively.

The electrode assembly 110 may be accommodated in the pouch 140 with an electrolyte. The electrolyte may include an organic solvent such as ethylene carbonate (EC), propylene carbonate (PC), diethyl carbonate (DEC), ethylmethyl carbonate (EMC) or dimethyl carbonate (DMC), and a lithium salt such as $LiPF_6$ or $LiBF_4$.

The first electrode tab 120 may be electrically connected to the first electrode plate 111 of the electrode assembly 110. The first electrode tab 120 may extend outwardly and protrude through a planar part 140b provided in the pouch 140. The planar part 140b is described in detail below. The first electrode tab 120 may further include a first insulation tape 121 inside the planar part 140b. The first insulation tape 120 may surround the first electrode tab 120. The first insulation tape 121 may serve to prevent an electrical short circuit of metal layers 141a and 142a of the pouch 140. The first electrode tab 120 may include aluminum or an aluminum alloy. However, the material of the first electrode tab 120 is not limited to the materials specifically described herein.

The second electrode tab 130 may be electrically connected to the second electrode plate 112 of the electrode assembly 110. The second electrode tab 130 may extend outwardly protrude through the planar part 140b of the pouch 140. The second electrode tab 130 may further include a second insulation tape 131 inside the planar part 140b. The second insulation tape 131 may surround the second electrode tab 130. The second insulation tape 131 may prevent or reduce a likelihood of an electrical short circuit of metal layers 141a and 142a of the pouch 140.

The first electrode tab 120 and the second electrode tab 130 may protrude and extend outside of the pouch 120 through the planar part 140b. The first electrode tab 120 and the second electrode tab 130 may extend beyond a peripheral edge of the pouch 140. The first electrode tab 120 and the second electrode tab 130 may be disposed parallel to each other. In addition, the second electrode tab 130 may be in a shape of a planar plate. However, the first electrode tab 120, disposed parallel to the second electrode tab 130, may be upwardly bent, so that an upper portion of the first electrode tab 120 may be positioned above the planar part 140b.

The pouch 140 may generally include a first pouch 141 and a second pouch 142. The first pouch 141 and the second pouch 142 may each be formed of an integrally formed rectangular pouch film that is folded on one side, along a length of the pouch 140. The first pouch 141 may be formed by a pressing process and may have a groove to accommodate the electrode assembly 110. After the electrode assembly 110 is disposed in the groove of the first pouch 141, the pouch 140, e.g., edges of the pouch 140, may be fused or adhered by heating and tightly pressing corresponding edges of the first pouch 141 and the second pouch 142. An electrolyte may be retained within the pouch 120.

Adhering portions 140a may be at opposite sides of the pouch 120, corresponding in position to opposite sides of the electrode assembly 110. The adhering portions 140a may be formed by fusing or adhering together the first pouch 141 and the second pouch 142, e.g., opposing edges of the first pouch 141 and the second pouch 142. The adhering portions 140a may be planar and may extend horizontally from the cavity of the pouch 140 by a predetermined length.

The planar part 140b, from which the first electrode tab 120 and the second electrode tab 130 outwardly extend and protrude, may include portions of the first pouch 141 and the second pouch 142 that are adhered or welded to each other, and may extend between the opposing adhering portions 140a.

According to some embodiments, the adhering portions 140a may be formed at opposing side surfaces of the first pouch 141 and the second pouch 142. The planar part 140b may formed by adhering edges of one side of the first pouch 141 and the second pouch 142. The planar part 140b may correspond in position to the side of the pouch 140 from which the first electrode tab 120 and the second electrode tab 130 protrude. The first electrode tab 120 and the second electrode tab 130 may be electrically connected to the first electrode plate 111 and the second electrode plate 112 of the electrode assembly 110.

The first pouch 141 may have a multi-layered structure including the metal layer 141a, a first insulation layer 141b formed on one surface of the metal layer 141a, and a second insulation layer 141c formed on the other surface of the metal layer 141a. The second pouch 142 may also have the same multi-layered structure as the first pouch 141. The adhering portions 140a and the planar part 140b may be formed by adhering or welding first insulation layers 141b and 142b of the first and second pouches 141 and 142 together.

The first insulation layers 141b and 142b of the first and second pouches 141 and 142 may be made of a thermally adhesive material to facilitate adhering or welding the first pouch 141 and the second pouch 142 together.

The PTC device 150 may be electrically connected to the first electrode tab 120 and the lead plate 160. The PTC device 150 may include a first PTC lead plate 151 having a first end connected to the first electrode tab 120 and a second end connected to a PTC device body 152, and a second PTC lead plate 153 having a first end connected to the PTC device body 152 and a second end connected to the lead plate 160. The second end of the PTC device body may be electrically connected to the lead plate 160. According to some embodiments, resistance may increase when an internal temperature of the pouch type battery 100 rises.

The first end of the first PTC lead plate 151 may be electrically connected to the first electrode tab 120, and the second end of the first PTC lead plate 151 may be electrically connected to a first surface of the PTC device body 152. The first end of the second PTC lead plate 153 may be electrically connected to a second surface of the PTC device body 152, opposite the first surface of the PTC device body 152, and the second side of the second PTC lead plate 153 may be electrically connected to the lead plate 160. For example, the PTC device body 152 may be between the first PTC lead plate 151 and the second PTC lead plate 153. The PTC device 150 may be positioned above the planar part 140b, and extend substantially parallel to the planar part 140b.

The lead plate 160 may extend outwardly from the planar part 140b in a direction substantially parallel to the second electrode tab 130. The lead plate 160 may include a metal or an equivalent thereof. The lead plate 160 may have a first side that extends past the planar part 140b and a second, opposing side that is electrically connected to the second PTC lead plate 153 of the PTC device 150 and connected to the planar part 140b. For example, at least a portion of the second side may be connected to the planar part 140b. According to some embodiments, the second side of the lead plate 160 may be disposed between the second PTC lead plate 153 and the planar part 140b. In addition, as described above, the second side of the lead plate 160 may be connected to the planar part 140b, and be positioned inside the photocurable adhesive 170. The photocurable adhesive 170 may protect the second side of the lead plate 160 that is electrically connected to the PTC device 150, from external elements and may secure the lead plate 160 such that it is electrically connected to the PTC device 150.

The photocurable adhesive 170 may be coated on the first electrode tab 120, the PTC device 150 and the lead plate 160, which are electrically connected to each other. The photocurable adhesive 170 may cover the first electrode tab 120, the PTC device 150 and the lead plate 160. For example, as illustrated in FIG. 2, the photocurable adhesive 170 may cover and may be in direct contact with an upper surface of the PTC device 150, e.g., an upper surface of the first PTC lead plate 151, and may extend along and directly contact exposed sides of the PTC device, the first electrode tab 120, and the lead plate 160. The photocurable adhesive 170 may be a two-component adhesive having an insulating hardener hardened by ultraviolet (UV) radiation and an insulating resin mixed therein. The photocurable adhesive 170 may be transparent or colorless. The photocurable adhesive 170 may have any color.

The coating and hardening of the photocurable adhesive 170 is described below. First, the first electrode tab 120 may be bent so that at least a portion of the first electrode tab 120 is positioned above the planar part 140b. Thus, the first electrode tab 120, the PTC device 150 and the lead plate 160, which are electrically connected, are positioned above the planar part 140b. The photocurable adhesive 170 may be coated on the first electrode tab 120, the PTC device 150 and the lead plate 160 to cover the first electrode tab 120, the PTC device 150 and the lead plate 160. When UV rays are radiated to the photocurable adhesive 170, the photocurable adhesive 170 may be hardened, thereby securing and protecting the first electrode tab 120, the PTC device 150 and the lead plate 160 within the photocurable adhesive 170. As illustrated in FIG. 1, the photocurable adhesive 170 may expose a portion of the first electrode tab 120 and the lead plate 160.

The photocurable adhesive 170 may fix the first electrode tab 120, the PTC device 150 and the lead plate 160, which are electrically connected to each other, to the pouch 140. The photocurable adhesive 170 may expose a portion of the lead plate 160 to the outside and the first electrode tab 120, as shown in FIG. 1. The PTC device 150 may be completely surrounded by the photocurable adhesive 170. As such, use of a separate tape may not be required. In addition, the photocurable adhesive 170, which may include an insulating material, may protect the first electrode tab 120, the PTC device 150 and the lead plate 160 from external elements.

Figure 5:
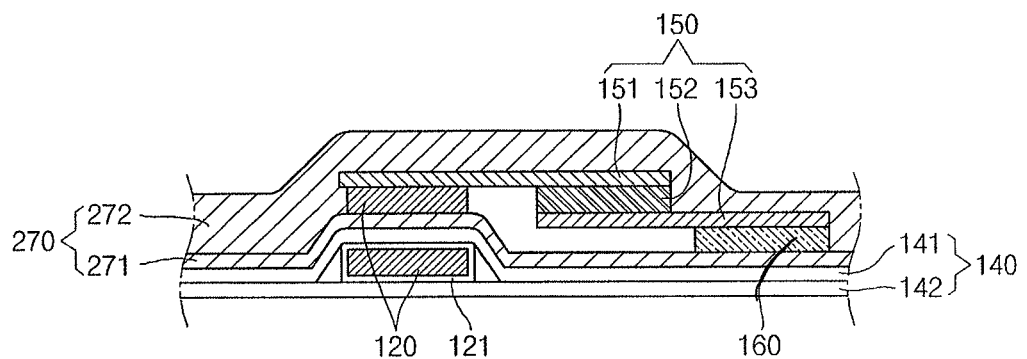
FIG. 5 illustrates a cross-sectional view of another example of the pouch type battery of FIG. 1, taken along line I-I'.

FIG. 5 illustrates a cross-sectional view of another example of the pouch type battery of FIG. 1, taken along line I-I'. Referring to FIG. 5, the illustrated pouch type battery may be substantially the same as the pouch type battery 100 shown in FIG. 2, except for the presence of a photocurable adhesive 270. Thus, the description of the embodiments that follows relates to the photocurable adhesive 270.

The photocurable adhesive 270 may include a first photocurable adhesive 271 and a second photocurable adhesive 272. The first photocurable adhesive 271 may be coated on the planar part 140b. The first photocurable adhesive 271, which may be coated on the planar part 140b, may prevent an electrical short circuit between the first electrode tab 120, the PTC device 150 and the lead plate 160, which are positioned above the planar part 140b, and the first pouch 141. The first photocurable adhesive 271 may fix and adhere together the first electrode tab 120 and the lead plate 160, which may come into contact with an upper portion of the planar part 140b, to the planar part 140b. For example, the first photocurable adhesive 271 may be provided to increase an electrical insulating property of the planar part 140b of the pouch 140 and to fix and adhere the first electrode tab 120 and the lead plate 160 to the planar part 140b.

The second photocurable adhesive 272 may be positioned on the first photocurable adhesive 271 and on the first electrode tab 120, the PTC device 150, and the lead plate 160, which are electrically connected to each other. The second photocurable adhesive 272 may fix the first electrode tab 120, the PTC device 150 and the lead plate 160, which are electrically connected to each other, to the planar part 140b and may protect the PTC device 150 and the lead plate 160 from external elements.

As described above, in the pouch type battery 100, the photocurable adhesives 170 and 270 may be used to fix, e.g., secure together the first electrode tab 120, the PTC device 150 and the lead plate 160, which are electrically connected to each other, instead of using a manual taping process. Accordingly, a manufacturing process of the pouch type battery may be simplified and automated. In addition, the pouch type battery 100 may enhance adhesion quality by increasing adhesion strength between the pouch 140 and each of the first electrode tab 120, the PTC device 150, and the lead plate 160, and securing adhered positions thereof, using the photocurable adhesives 170 and 270.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A pouch type battery, comprising:
an electrode assembly;
a pouch accommodating the electrode assembly;
a first electrode tab electrically connected to the electrode assembly, the first electrode tab extending outside of the pouch;
a positive temperature coefficient (PTC) device electrically connected to the first electrode tab, the PTC device being fixed to the pouch by a photocurable adhesive on an exterior surface of the pouch type battery; and
a lead plate electrically connected to the PTC device, wherein the PTC device includes:
a first PTC lead plate electrically connected to the first electrode tab;
a second PTC lead plate electrically connected to the lead plate; and
a PTC device body sandwiched between the first PTC lead plate and the second PTC lead plate and electrically connected to the first lead plate and the second lead plate.

2. The pouch type battery as claimed in claim 1, wherein the photocurable adhesive exposes a portion of the lead plate.

3. The pouch type battery as claimed in claim 1, wherein the photocurable adhesive includes an insulating hardener hardened by UV radiation and an insulating resin.

4. The pouch type battery as claimed in claim 1, further comprising a second electrode tab electrically connected to the electrode assembly and extending outside of the pouch.

5. A pouch type battery, comprising:
an electrode assembly;
a pouch accommodating the electrode assembly;
a first electrode tab electrically connected to the electrode assembly, the first electrode tab extending outside of the pouch;
a positive temperature coefficient (PTC) device electrically connected to the first electrode tab, the PTC device being fixed to the pouch by a photocurable adhesive; and
a lead plate electrically connected to the PTC device, wherein the PTC device includes:
a first PTC lead plate electrically connected to the first electrode tab;
a second PTC lead plate electrically connected to the lead plate; and
a PTC device body sandwiched between the first PTC lead plate and the second PTC lead plate and electrically connected to the first lead plate and the second lead plate,
wherein the pouch includes a first pouch and a second pouch for accommodating the electrode assembly, adhesion parts including opposite sides of the first pouch and the second pouch that are adhered together, and a planar part extending between and connecting the adhesion parts.

6. The pouch type battery as claimed in claim 5, wherein the first electrode tab extends through the planar part of the pouch and includes an exposed portion.

7. The pouch type battery as claimed in claim 6, wherein the exposed portion of the first electrode tab includes a bent portion positioned above the planar part.

8. The pouch type battery as claimed in claim 6, further comprising an insulator between the first electrode tab within the planar part and interior walls of the planar part.

9. The pouch type battery as claimed in claim 8, wherein the insulator surrounds the first electrode tab within the planar part.

10. The pouch type battery as claimed in claim 5, wherein the photocurable adhesive is on the PTC device and fixes the PTC device to an upper portion of the planar part.

11. The pouch type battery as claimed in claim 5, wherein the photocurable adhesive includes a first photocurable adhesive on the planar part, and a second photocurable adhesive covering an upper portion of the first electrode tab, the PTC device and the lead plate, the upper portion of the first electrode tab being on the first photocurable adhesive.

12. The pouch type battery as claimed in claim 11, wherein the first photocurable adhesive adheres the first electrode tab and the lead plate to the planar part.

13. The pouch type battery as claimed in claim 11, wherein the second photocurable adhesive extends along a side of the first electrode tab and a side of the lead plate.

14. The pouch type battery as claimed in claim 5, further comprising a second electrode tab electrically connected to the electrode assembly and extending through the planar part of the pouch.

15. The pouch type battery as claimed in claim 5, wherein the lead plate is on both the first and second pouches.

16. The pouch type battery as claimed in claim 5, wherein the first and second pouches each include a metal layer sandwiched between insulation layers.

* * * * *